United States Patent [19]
Bonne et al.

[11] Patent Number: 5,085,576
[45] Date of Patent: Feb. 4, 1992

[54] APPARATUS AND METHOD FOR DETECTING LEAKS IN A SYSTEM FOR DELIVERING GASEOUS FUEL

[75] Inventors: Ulrich Bonne, Hopkins; George J. Tate, Edina; Edward Schwarz, Minneapolis, all of Minn.

[73] Assignee: Honeywell Inc., Minneapolis, Minn.

[21] Appl. No.: 550,784

[22] Filed: Jul. 10, 1990

[51] Int. Cl.$^5$ .............................................. F23N 5/24
[52] U.S. Cl. ........................................ 431/22; 431/18; 431/119; 137/551; 137/557
[58] Field of Search .......................... 431/22, 18, 119; 137/312, 557, 558, 551, 66

[56] References Cited

U.S. PATENT DOCUMENTS 2,729,221  1/1956  Gorham et al. .
2,757,362  7/1956  Gutkowski ............................ 431/22
3,999,932  12/1976  Matthews .
4,209,291  6/1980  Gandolfi et al. ................. 431/22 X
4,375,353  3/1983  Nicholas et al. .

FOREIGN PATENT DOCUMENTS 116826  5/1987  Japan ..................................... 431/22

Primary Examiner—Larry Jones
Attorney, Agent, or Firm—Edward Schwarz

[57] ABSTRACT

A leak detector for a valve controlling flow of fuel to a combustion chamber employs a fuel concentration sensor in a sensing chamber placed downstream from the valve seat. The valve has a downstream chamber which is in communication by diffusion through an orifice, with a source of pressurized air. By injecting air into the downstream chamber through this orifice after the valve has closed and then measuring with the sensor the fuel concentration within the sensing chamber, excessive fuel leakage by the valve can be detected.

16 Claims, 3 Drawing Sheets

APPARATUS AND METHOD FOR DETECTING LEAKS IN A SYSTEM FOR DELIVERING GASEOUS FUEL

BACKGROUND OF THE INVENTION

When a gaseous fluid (gas) is provided for mixing with another gas such as air, and then the mixture is to be used in a process of some kind, it is necessary to be able to control flow of the gas, and for this purpose valves are provided in the pipe or duct in which the gas flows. In these cases, it is usually necessary that the valve be capable of positively and reliably shutting off when gas flow is to end. These valves are mechanical devices and as such can malfunction for a number of reasons such as excess stress, vibration, particles in the gas stream, wear, or defects in manufacturing, any of which can result in leakage when the valve purportedly is shut. This is always undesirable, and may be a hazard if the gas involved has potential for doing harm if leakage occurs. Therefore it is important that leakage be reduced to an absolute minimum. However, it is not possible totally to prevent gas leakage in every valve of a large installed base because of the certainty of eventual deterioration and defects for a small fraction of valves, as well as the certain knowledge that the humans who have responsibility for proper operation of the gas control valves will not always perform their duties of inspection, use, and maintenance without error. For all these reasons, it is evident that means for sensing gas leakage in a valve provide an extra measure of safety and economy in the operation of such valves.

Perhaps the most common instance of gas flow control arises in the use and control of gaseous fuels (of which natural gas and propane are examples) used for heating and for industrial purposes. A very common situation is in gas fired burner systems where the burner is run for a period of time and then shut off when sufficient heat has bee provided. The gaseous fuel is mixed with air in a proportion and manner allowing for efficient combustion and heat generation. Such systems have frequent valve operation, and accordingly there is over a long period of operation, a non-zero probability of valve malfunction. While the remainder of this patent description will deal with sensing leakage of such gaseous fuels, the reader should understand that the description can apply to any situation where gas flow must be shut off on occasion and where the leakage of gas through the valve when shut is undesirable.

It is necessary for such systems using gaseous fuels regardless of their size to have their sequence of operation controlled, with each individual step necessary for safe and efficient operation of the heating unit occurring at the proper time. At the same time, there are a number of tests of operation and function which must be performed at preset times in the sequence to assure that previous steps have been performed properly. The newest versions of these systems use a microprocessor connected to control the elements of the heating unit. The microprocessor is programmed to command the sequence of the various functions which must be performed prior to, during and following an actual combustion operation.

These combustion systems typically include a combustion chamber, a source of the pressurized gaseous fuel, an air duct for carrying a flow of combustion air to the combustion chamber, a fuel injection nozzle within the air flow for supplying the gas to the combustion air so as to permit mixing of the fuel and air prior to entering the combustion chamber, and a valve for regulating flow of the fuel. Larger types of these systems have combustion air induced into the combustion chamber by use of a blower. There is a pipe which conducts the fuel from its source to the inlet port of the valve and another pipe which conducts the fuel from the outlet port of the valve to the nozzle.

It is customary in large systems to use a modulating fuel valve which can be opened to a number of different positions. In a system where there is a microprocessor which controls combustion system activity, such valves typically are electrically controlled by a solenoid receiving a valve control signal from the microprocessor. Modulating the valve between its closed and full open position controls the amount of fuel provided to the combustion chamber, and hence the rate of heat output. By adjusting speed of the blower or the position of dampers within the air duct the amount of air and fuel can be controlled so as to maintain almost precisely the stoichiometric fuel-air ratio. When there is no longer a demand for heat, the microprocessor sets the valve control signal to a closure value or signal which commands the valve to close completely, and the closure signal is maintained until another demand for heat occurs. For safety's sake, the valve is typically held closed by a spring against which the solenoid acts when opening the valve. Thus the closure signal state of the valve control signal may well be nothing more than the absence of electrical power to the solenoid.

As mentioned above, it is important that a valve responds to the closure signal by reliably, promptly and completely shutting so that unsafe amounts of gas cannot pass to the nozzle after the closure signal has been applied to the valve. In the past, there have been various design approaches to assure that such gas valves close reliably. For example, frequently two valves are used serially so that malfunction of both valves is necessary before fuel leakage occurs. It is common to specific periodic intervals for checking valve performance or to specify a service life after which the valve must be replaced. However, these approaches are relatively expensive and simply reduce the likelihood of valve leakage rather than allowing immediate correction of the leakage whenever it happens.

Another approach is to use devices which sense the presence of leaks and signal an operator when leakage is detected. There ar basically three different approaches which these type of devices use. A first senses flow within the fuel supply pipe when the valve is supposed to be closed, allowing the inference of a fuel leak. A second senses fuel pressure, inferring leaks from a change in pressure somewhere within the fuel delivery system. Neither of these techniques have the ability to sense potentially dangerous leaks in large systems where large amounts of fuel flow while the valve is open, because even a small amount of fuel flow on a percentage of maximum basis can be a relatively large amount of fuel in absolute terms.

A third type of leak detector relies on sensing presence of fuel within the system downstream of the fuel valve when the valve is receiving its closure signal. U.S. Pat. No. 3,999,932 describes a system using pressure buildup resulting from a gas leak in the control valve to close an auxiliary valve and shut down gas flow to the system. Of course, malfunction of the auxiliary valve or a failure of pressure buildup may allow leaks to occur.

U.S. Pat. No. 4,375,353 discloses the use of a catalytic ga detector to detect presence of gas leaking into the combustion chamber of a furnace. The known characteristic of catalytic detectors to change their output with age or exposure to certain compounds may affect the reliability of their leak detection function.

Recently developed semiconductor devices called "microbridges" can accurately measure both the thermal conductivity and specific heat of gases, from which can be inferred the concentration of fuel in a fuel-air mixture. These sensors use highly stable noble metals and refractory materials as the elements in direct contact with the gas on which the measurements are performed. Such sensors typically include for example a pair of thin film temperature transducers adjacent a thin film heater, with the gas to be measured occupying a space between them. Semiconductor sensors of this type are discussed in more detail in one or more of U.S. Pat. Nos. 4,478,076; 4,478,077; 4,504,144; 4,651,564; and 4,683,159, all having an assignee common with the present application.

It known that the specific heat and thermal conductivity of gaseous fuels commonly used in burners today are substantially different from these properties for air. When the fuel is mixed with air, these properties of the resulting mixture differ from those of either pure fuel or pure air and are a function of the concentration of fuel in the air. Accordingly, it is known that by measuring either or both of these aforementioned properties one can determine the concentration of the gaseous fuel in air if the type of gaseous fuel involved is known.

BRIEF DESCRIPTION OF THE INVENTION

We have found that leaks in a fuel control valve can be detected in certain circumstances by sensing the concentration of fuel downstream from the valve. Such a valve is typically used in a combustion system of the type having a combustion chamber, a source of pressurized gaseous fuel, an air duct for carrying combustion air to the combustion chamber, a blower or other means for inducing airflow in the air duct to the combustion chamber, and a fuel injection nozzle within the air flow. The valve is used for stopping and for regulating the flow of the fuel, closing responsive to a closure signal supplied by a control unit. A first pipe conducts the fuel from its source to the valve and a second pipe conducts the fuel from the valve to the nozzle.

In this invention, the valve further has an outlet chamber. There are means provided for injecting air at a preselected flow rate into the valve's outlet chamber. In such a system fuel leaked by the valve can be sensed by apparatus which includes a sensing chamber in indirect flow communication with at least one of the second pipe in the downstream chamber of the valve. Within the sensing chamber there is a sensor of the type described above for detecting presence of the fuel. The sensor provides the sensor signal whose value is representative of the fuel concentration within the air within the sensing chamber. The sensor's signal is supplied to a comparison unit which in turn provides a leakage signal responsive to the closure signal and a predetermined deviation in the value of the sensor signal from a predetermined standard.

The term "indirect flow communication" used extensively above means that the concentration of fuel in the gas within the sensing chamber is representative of the concentration of gaseous fuel in the air in the space with which the sensing chamber communicates. The mixture within the sensing chamber may have been established because of molecular level mechanisms such as Brownian movement causing individual molecules of fuel to enter the sensing chamber until the concentration is representative of the space communicating with the sensing chamber. It is also possible that the mixture of gases within the sensing chamber is a sample directly taken from the space with which the sensing chamber communicates. It is important for accurate sensing of the fuel concentration within the sensing chamber that the gases within the sensing chamber are not convecting, i.e., being kept in motion by a pressure or temperature differential or by mechanical stirring, while measurements are made. The measurements made by the microbridge sensor relies on the heat convection characteristics of the gas surrounding it, and any kind of forced motion of this gas alters its heat convection characteristics, and hence the measurements as well.

"Diffusing communication" is a related term meaning that mixing of the gases within the sensing chamber with gases outside the sensing chamber occurs almost totally because of differences in concentration of fuel in the two spaces, typically involving the aforementioned Brownian movement mechanism. "Diffusing communication" does not refer to mixing driven by temperature or pressure differentials.

The predetermined standard against which the sensor signal is measured depends on the sensor value for the maximum allowable concentration of fuel downstream from the valve after the valve is shut. This value in turn depends on the sensor values for pure air and for pure gaseous fuel.

A method for use with such a combustion system for sensing fuel leakage in the valve includes the steps of providing a chamber in diffusing communication with at least one other second pipe in a downstream chamber of the valve and then sensing the concentration of the fuel in the chamber. A fuel concentration signal whose value is representative of the fuel concentration in the air within the sensing chamber is compared with a preselected standard while the control unit is providing the closure to the valve. If there is a predetermined deviation in the value of the fuel concentration signal from the preselected standard then a leakage signal is provided which indicates unacceptable leakage of fuel by the valve.

DESCRIPTION OF THE PREFERRED EMBODIMENT

Figure 1:
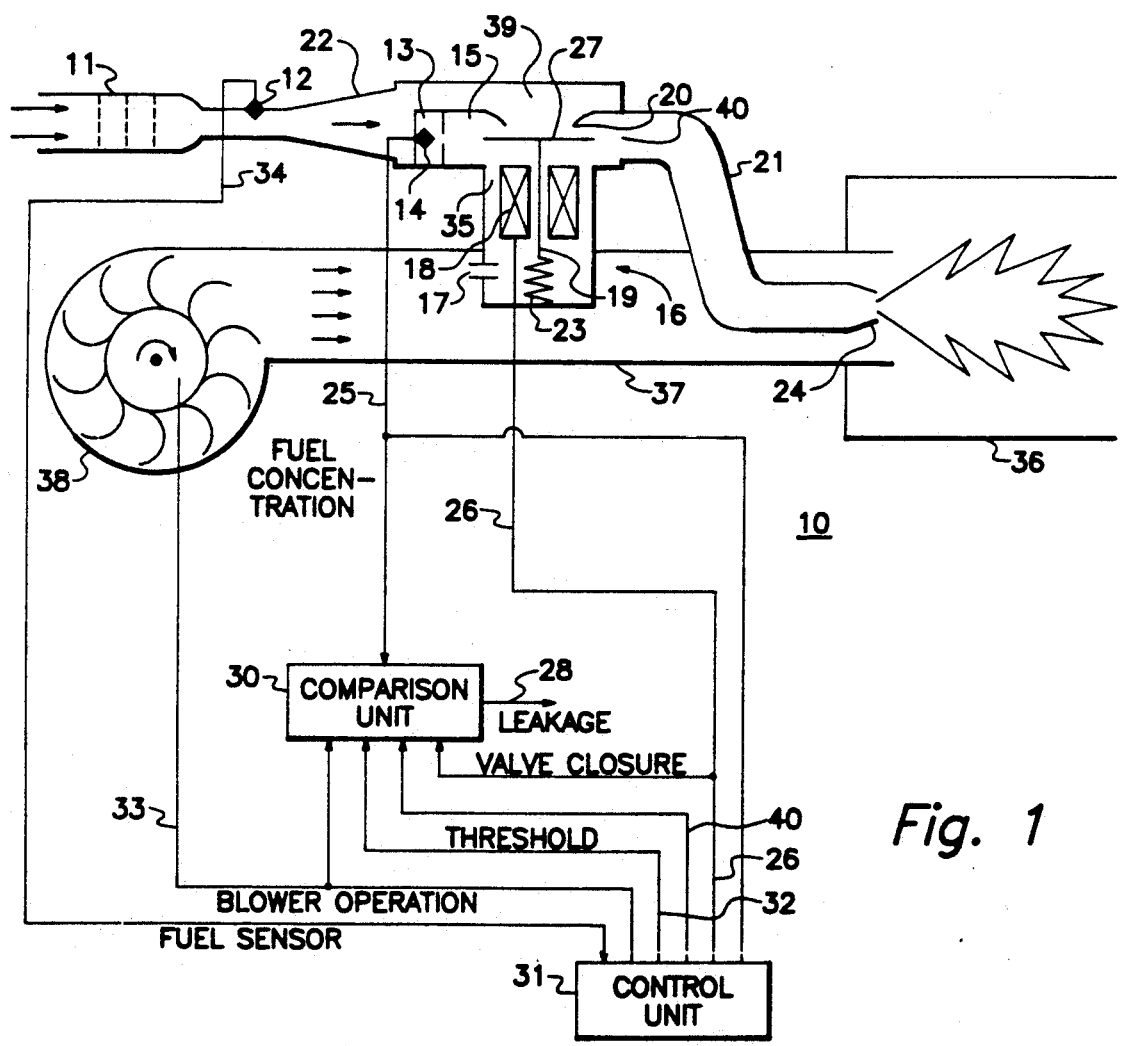
FIG. 1 is a structural diagram of a combustion system employing the invention for electronic leak detection.

FIG. 1 shows a combustion system 10 in which the invention is implemented. Among the conventional elements in it are the fuel source 11 shown diagrammatically as a pipe into the end of which is introduced gaseous fuel. There is downstream from this source a fuel flow sensor 12 whose purpose is to measure the flow rate of fuel in pipe 22. Pipe 22 is connected to an inlet chamber 39 of a valve assembly 16 which includes a valve seat 20 and a movable valve element 27. Valve element 27 is shifted between open and closed positions by a solenoid comprising winding 18 and armature 19 and which opens valve 16 by pulling valve element 27 away from seat 20. When electrical current does not flow in winding 18, spring 23 presses against the end of armature 19 to press element 27 against seat 20 and hold valve 16 closed. There is an outlet pipe 21 attached to the output port of valve 16. Pipe 21 conducts gaseous fuel flowing through valve 16 to a nozzle 24.

Combustion air is provided by a fan 38 which induces flow of air in air duct 37 as indicated by the arrows. Nozzle 24 is placed in duct 37 in a position which allows sufficient mixing of the fuel and air to permit efficient combustion. Combustion takes place in a chamber 36 as symbolized by the flame outline shown emanating from nozzle 24.

There is in the body of valve 16 an outlet chamber 35 having an orifice 17 through which bleeds a preselected flow rate of air into outlet chamber 35. This air mixes with fuel flowing through the valve from the inlet chamber 34 to the outlet chamber 35. When valve 16 is open the amount of air bleeding through orifice 17 into the fuel stream is an insignificant percentage of the total fuel stream. When valve 16 is closed ideally no gas passes through valve 16 between flange element 27 and seat 20. In the ideal case, and because of this flow of air through orifice 17, after a period of time after valve 16 has shut, flow through pipe 21 is of air only with no fuel component. While there are a number of ways to bleed air into orifice 17, the means which we prefer and which is shown in FIG. 1 is to place the body of valve 16 within air duct 37 with orifice 17 in an upstream (with respect to a surface of the valve housing surrounding the outlet chamber 35. It is also possible to have a separate hose or pipe connecting orifice 17 with the flow of air in duct 37. It is also possible to have a separate source of bleed air for introducing air into output chamber 35 through orifice 17.

As a practical matter, it is difficult to prevent a small amount of gas from leaking through valve 16 when it is closed. The size of orifice 17 and the pressure differential across it should be chosen to achieve a fuel concentration in pipe 2 arising from such leads when valve 16 is closed and the outlet chamber has been purged, of below one-tenth, or better, of below one-twentieth, of the lowest explosive limit of the gaseous fuel concentration in air. *Combustions, Flames, and Explosions of Gases*, 3d ed., 1987, by B. Lewis and G. Von Elbe, pub. Academic Press, reports that the lowest explosive limit fuel concentration for natural gas is 5.3% and for propane is 2.2%, both by volume.

For sensing the fuel concentration within outlet chamber 35, there is provided a sensing chamber 13 in communication with the downstream side of valve seat 20 through an orifice 15 to thereby allow gaseous molecules to pass between the two chambers. Chamber 14 may be located opposite the outlet port 40 of outlet chamber 35. We prefer that sensing chamber 13 is in what we call diffusing communication with the path of the fuel downstream from valve seat 20. At the very least chamber 13 should be in indirect flow communication with outlet chamber 35. (See the definitions of "diffusing communication" and "indirect flow communication" in the Brief Description of the Invention above.) In this embodiment the fuel concentration within chamber 14 will accurately track the fuel concentration in outlet chamber 35, although perhaps lagging it by a number of seconds. The important consideration is that the gas in chamber 13 is stagnating and has little macroscopic movement so that the thermal conductivity or heat capacity measurement of the gas on which sensor 14 bases its fuel concentration determination is not affected by convention of the gas within chamber 13.

Figure 2:
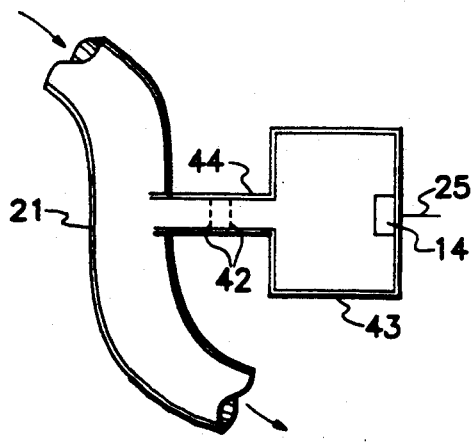
FIG. 2 shows an alternative location for the sensing chamber.

It is also possible to place the sensing chamber in diffusing communication with outlet pipe 21, as shown in FIG. 2. There is shown therein a pipe 44 connecting pipe 21 to a sensing chamber 43. Screens 42 are placed in pipe 44 to prevent any forced convection of the gaseous fuel mixture (or pure air) flowing through outlet pipe 21. A sensor 14 is placed within chamber 43 to determine the fuel concentration of the gas therein.

Referring again to FIG. 1, the control apparatus for implementing this leak sensing procedure is shown as comprising a comparison unit 30 which functions in connection with the sequencing of the various burner functions which are initiated and timed by a control unit 31. There are two distinct phases of operation of burner system 10 during which leak detection occurs. The first phase (first because it immediately precedes the second in time) is the so-called post purge cycle, "post purge" referring to the fact that the purging occurs after the combustion interval. When demand is satisfied in a burner system of the type in which this invention is intended for use, valve 16 is shut by placing a valve closure signal on valve control signal path 26. After the valve 16 is shut by the valve closure signal issued by control unit 31, combustion ceases for lack of fuel within chamber 36. However, there may still be a substantial amount of combustible fuel within and downstream from the valve 16 which may accumulate in chamber 36 and mix with air to create a potential hazard. To deal with this situation, the practice is to run the blower 38 during a postpurge interval, typically for from 30 and 60 seconds, to exhaust these combustible gases. Blower 38 is under the control of control unit 31 which provides a run signal on a signal path 33 from control unit 31 to blower 38 during which blower 38 operates. The blower control signal is provided via path 33 to comparison unit 30. The valve closure signal on path 26 which causes valve 16 to close is provided to comparison unit 30 also.

Figure 5:
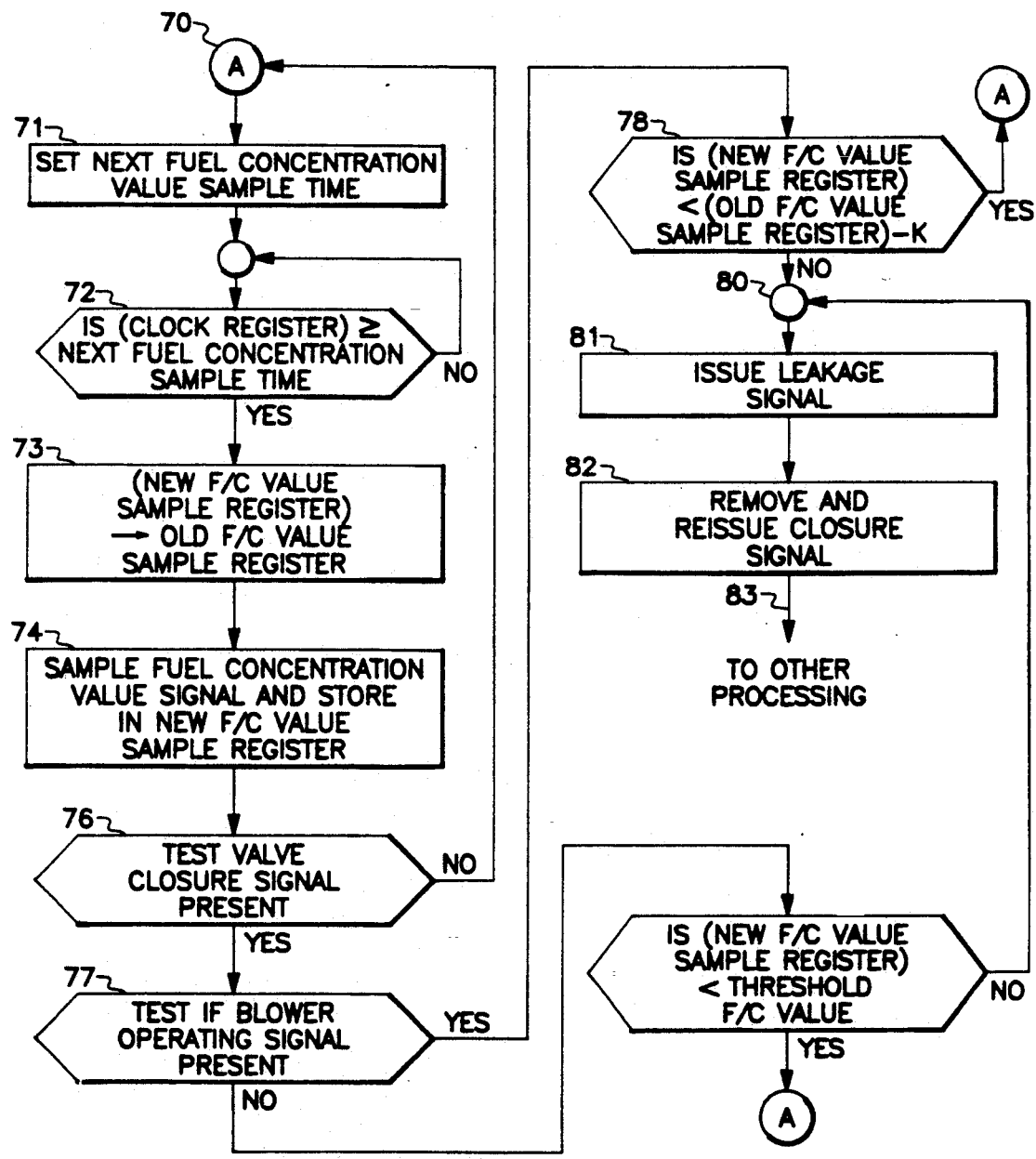
FIG. 5 is a program flow chart specifying the operations performed by a microprocessor implementing the method of the invention.

It is most convenient to describe the operation of FIG. 1 in terms of the kind and sequence of the functions of control unit 31 and comparison unit 30. In a typical installation, comparison unit 30 and control unit 31 will be combined in a single microprocessor. This microprocessor is programmed to perform the functions of comparison unit 3 to implement this invention and also all of the other functions as well which are necessary for operation of the burner system. FIG. 5 is a flowchart of software which may be placed in such a microprocessor to cause it to function as comparison unit 30 in implementing this invention. Functions which will typically be performed by control unit 31 have been omitted from FIG. 5 except where necessary in explaining the invention.

There are various signals which are provided to control unit 31 and comparison unit 30 by the sensors. If quantitative, they will be processed internally in digital format by the microprocessor, and thus, must be presented as digital signals to the microprocessor. Since such sensors typically provide an analog output, the signal is provided to an analog to digital converter before being applied to the microprocessor and its control unit 31 and comparison unit 30 functions. Some microprocessors have an analog to digital circuit integral with the microprocessor which can be used to perform these conversions. Thus, the fuel concentration signal from sensor 14 and the fuel flow rate signal from sensor 12 are both typically processed as digital values.

Such microprocessors usually have an internal real time clock whose value can be accessed by the software by reading or writing into a clock register. A separate clock circuit independently updates the contents of the clock register at regular intervals, typically adding one to the clock register contents every millisecond.

The various control signals issued by comparison unit 30 and control unit 31 may be Boolean to indicate one of two states for the element involved, or may be either digital or analog if the particular element to which the signal is directed has the capability of modulating the level of its operation. For example, it may be possible to set valve 16 in a variety of open positions depending on the particular demand requirements and time in the operating sequence. Similarly, the speed of fan 38 may be selectable by control unit 31. In either of these cases, it is necessary to specify the operating level for the element involved, and this forms a part of the burner control algorithm which the control unit 31 function of the microprocessor implements. The leakage signal from comparison unit 3 which indicates whether the valve 16 is leaking an unacceptable amount is a Boolean value having a "0" value for example to indicate proper operation and a "1" value to indicate excess leakage.

One should understand that the function and sequence of the various operations performed by comparison unit 30 and described by the flowchart of FIG. 5 will typically be run at times which may be scheduled with reference to the real time clock. It should also be understood that the order in which the sequence of these functions or operations is performed may vary substantially as long as the overall function of this system is unaffected. In FIG. 5 there are 3 different types of functional elements. Those in rectangles are operation functions which specify some data manipulation activity such as setting the contents of one register to a different value or providing some external signal such as a leakage signal in activity element 81. There are also connector elements such as element 70 which specifies a jump or branch destination in the software implementing the functions of this flowchart. There are also decision elements which involve testing for a particular condition and selecting the instructions to be executed following this test on the basis of the results of that test. For example, in decision element 72, the value of the control unit's internal clock is greater than or equal to a particular time stored within the microprocessor comprising comparison unit 30 and control unit 31. Lastly, within the various elements of FIG. 5, parentheses should be interpreted to mean "the contents of" whatever register or data cell is contained within the parentheses.

The software instructions represented by the flowchart of FIG. 5 are intended to be executed at periodic intervals. Accordingly, activity element 71 provides for setting the next fuel concentration value sample time in a convenient data register. This value may be extracted from a table or be generated by simply adding a fixed time quantity to the current value of the next fuel concentration value sample time. The time between successive fuel concentration value samples will be typically a parameter established in the software at the factory. Decision element 72 represents the testing of the contents of the clock register to be greater than or equal to the next fuel concentration value sample time. If the clock register is smaller than this value then the time for reading the next fuel concentration value has not yet been reached. Accordingly, the "no" decision branch shows a return to the start of element 72. In a typical system, the microprocessor will execute other instructions before again making this test.

When the time to next test the fuel concentration value signal has elapsed then activity element 73 specifies that the contents of a new fuel concentration (f/c) value sample register is stored in an old f/c value sample register. Both of these registers may be individual random access memory locations within the microprocessor comprising comparison unit 30. The activity symbolized by element 74 occurs immediately thereafter and specifies that the signal on path 25 representing the fuel concentration value sensed by sensor 14 is sampled, converted to digital format, and stored in the new f/c value sample register.

As can be seen in FIG. 1, the fan operation signal on path 33 and the valve closure signal on path 26, both of which are provided by control unit 31, are supplied to comparison unit 30 as well as to the respective fan 38 and valve 16 which they control. In a typical embodiment, where comparison unit 30 and control unit 31 comprise the same microprocessor, there may be simply a control bit corresponding to each of these functions which specifies that the blower 38 is operating or the valve 16 is closed. In decision element 76, the internal value specifying valve closure signal status is tested and if the valve closure signal is not present o path 26 (meaning that valve 26 is or should be open), then the proper point in the operating sequence of system 10 for employing the elements of this invention has not yet been reached. Of course, the sensor 14 can detect the condition of the valve being open by the fact that the gas properties sensed are those of pure gaseous fuel, and it may well be that an operating system will perform such a test. This loop is executed a regular intervals while valve 16 is being held open by the absence of the closure signal. The old f/c value sample register and the new f/c value sample register will both contain the value indicating 100% fuel concentration while the valve is being held open.

If the valve closure signal is present then the software tests whether the blower operating signal is present a indicated by decision element 77. This is necessary because different tests are performed depending on whether the operating sequence is in the post purge mode, or if the post purge interval has elapsed and the burner system 10 is in its ready mode waiting for the next demand signal to start the operating sequence once again. If the blower operating signal is present then the fuel concentration value within outlet chamber 35 should continually decrease during the post purge interval. The software instructions symbolized by decision element 78 tests the contents of the new f/c value sample register to be less than the contents of the old f/c value sample register less some constant k. This constant k will be provided to comparison unit 30 as part of the data transferred o data path 40. The value k will be selected to reflect the minimum decrease in the fuel concentration value over the sample time interval tolerable in a properly operating system. Since the change in fuel concentration value will decrease towards the end of the purge interval, it is possible that k should be made a function from the time of the start of the post purge operation, and conceivably may even become zero at the end of a long purge. If this test is passed satisfactorily, then control is transferred back to the A connector element 70 preparatory to again executing the instructions symbolized by activity element 71. Should the test of decision element 78 be failed, then activity is transferred to connector element 80 and to the activity element 81 providing for issuing a leakage signal. Activity then proceeds further to activity element 82 where instructions are executed which removes and reissues the valve closure signal so as to attempt again to close the valve 16. It is entirely possible that upon another attempt, the valve 16 will close properly. However, any malfunction in a fuel valve 16 is a potentially serious condition which should be investigated by the operator as quickly as possible. Hence, it is important that the leakage signal be issued in any event. Processing path 83 then indicates that other processing occurs If the post purge interval has been completed then decision element 77 transfers instruction execution to the instructions symbolized by decision element 84. These instructions test the contents of the new f/c value sample register to be less than a threshold f/c value. This threshold value too may be provided with the installation of the software in the microprocessor comprising comparison unit 30 and control unit 31. Typically the threshold f/c value should be some fraction, perhaps 50 percent, of the f/c value which constitutes a hazard. If this test is failed then control is transferred to connector element 80 and the instructions specified by activity elements 81 and 82 are executed. This function of this part of the software assures that a warning is instantly provided if valve 16 starts to leak during the standby interval between successive operating sequences.

Figure 3:
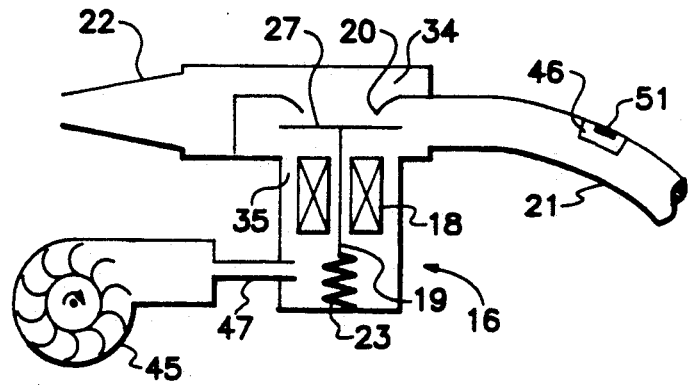
FIG. 3 shows an alternative arrangement for injecting air into the valve's downstream chamber.

There are a number of variations on the system as shown in FIG. 1 which may be employed in implementing the invention. In FIG. 3 instead of relying on blower 38 for bleed air to purge gas from chamber 35, there is a small purge blower 45 connected by duct 47 to chamber 35. We contemplate that blower 45 will run continuously, so that there will be a slow but steady movement of air through pipe 21. There is an enclosure 46 which is within pipe 21 and in indirect flow communication with the gases within pipe 21 through an orifice not shown in FIG. 3. A sensor 51 similar to sensor 13 of FIG. 1 measures a parameter of the gas within enclosure 46 from which can be deduced the fuel concentration of this gas. Should valve 16 leak then an increase in fuel concentration in pipe 21 will be sensed by sensor 51. The signal from sensor 51 is processed in a fashion very similar to the processing for the signal of sensor 13, although perhaps the various parameters may be somewhat different because of the different locations of the sensing chambers and because of the presence of air injected at all times directly into chamber 35 by blower 45.

Figure 4:
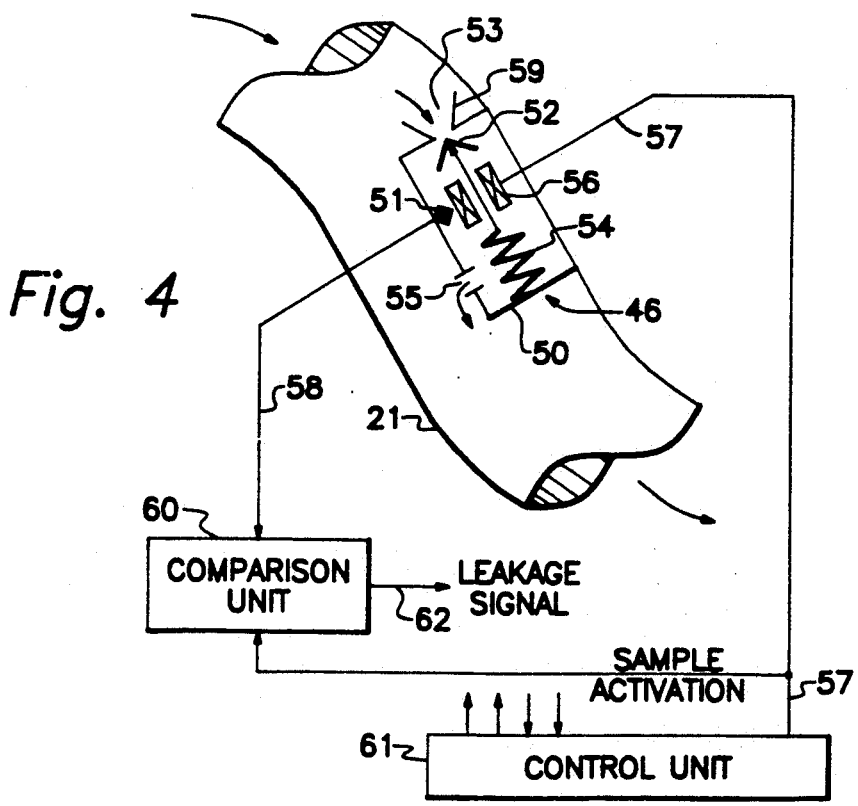
FIG. 4 shows an embodiment combining within the downstream fuel duct, flow sensing with fuel concentration sensing.

In FIG. 4 an embodiment for the sensing device 46 in FIG. 3 is disclosed as comprising a small enclosure 50 mounted on an interior wall of pipe 21. Enclosure 50 has a funnel-shaped inlet orifice 59 facing upstream within pipe 21. There is a valve 52 within enclosure 50 which is urged toward orifice 53 by spring 54 and which when blocking orifice 53 prevents flow of gas within pipe 21 through the interior of housing 50. At selected times an activation signal is applied on path 57 to solenoid 56. The activation signal causes the valve 52 to withdraw from the orifice 53 against the force of spring 54 and allows the gas stream within pipe 21 to enter housing 50. The gas stream can flow through enclosure 50 and out orifice 55 to thereby assure that the entire interior of enclosure 50 is suffused with gas having a composition identical to that of the gas stream in pipe 21. After a period of time, the activation signal on path 57 is removed and spring 54 again presses valve 52 into orifice 53 to prevent flow of gas through the interior of enclosure 50. With orifice 53 thus plugged, there is no foreed convection of ga within enclosure 50 and sensor 51 will not have the accuracy of the fuel concentration value read by it affected by such forced convection. It is necessary to wait for a short period of time after closing orifice 53 before sampling the value provided by sensor 51 to allow the turbulent motion of the gas within enclosure 50 to abate.

Control unit 61, which can be considered to be similar to control unit 31, provides an activation signal on path 57 at scheduled times. Comparison unit 60 also receives the activation signal and is conditioned thereby to perform tests similar to those described in connection with FIG. 5 on the f/c value signal provided on path 58. A similar leakage signal is provided on path 62 should the f/c value encoded in the signal on path 58 fall outside of the parameter values established. This alternative embodiment enjoys the advantages of forced convection in receiving prompt exposure to changes in fuel concentration within outlet chamber 35 of valve 16 and within pipe 21, and at the sam time provides for accurate sensing of fuel concentration. Such a sensing device may also be used during actual combustion to sense the velocity of the fuel stream within pipe 21 to thereby determine the rate of fuel delivery.

Having thus described our invention, what we wish to protect as our exclusive right is described and claimed as follows:

1. In a combustion system of the type having a combustion chamber; a source of pressurized gaseous fuel; an air duct for carrying combustion air to the combustion chamber; means for inducing air flow in the air duct to the combustion chamber; a fuel injection nozzle within the air flow; a valve for regulating flow of the fuel, said valve closing responsive to a closure signal; a first pipe conducting the fuel from its source to the valve; a second pipe conducting the fuel from the valve to the nozzle; and a control unit providing the closure signal to the valve; an improvement for sensing leaking of fuel by the valve, comprising in the valve, an outlet chamber and means for injecting a preselected flow rate of air into the outlet chamber, the improvement further comprising a) a sensing chamber in indirect flow communication with at least on of the second pipe and the outlet chamber of the valve;

b) a sensor within the sensing chamber, said sensor providing a sensor signal having a value representative of the fuel concentration in the air within the sensing chamber; and c) comparison means receiving the sensor and closure signals for providing a leakage signal responsive to both the closure signal and a predetermined deviation in the value of the sensor signal from a predetermined standard.

2. The system of claim 1, wherein the comparison means includes means for providing the leakage signal responsive to the sensor signal value having a predetermined relation to a predetermined threshold value.

3. The system of claim 1, wherein the comparison means further comprises means for recording the sensor signal value at two different times, and means for providing the leakage signal responsive to the more recently recorded sensor signal value representing a fuel concentration greater than the fuel concentration represented by the earlier recorded sensor signal value less a predetermined fuel concentration.

4. The system of claim 1, wherein the air flow inducing means receives an airflow signal and induces air flow into the combustion chamber for the duration of the airflow signal, and wherein the control unit provides the airflow signal for a predetermined interval following the start of the closure signal, wherein the comparison means further comprises means for issuing the leakage signal when, following the end of the first predetermined interval, the fuel concentration represented by the value of the sensor signal exceeds a threshold value comprising the predetermined standard.

5. The system of claim 1, wherein the comparison means includes means for providing the leakage signal responsive to the difference in the fuel concentration value represented by the sensor signal at the beginning and the end of a interval of preselected length having a predetermined relation to a predetermined threshold difference value.

6. The system of claim 1 wherein the sensing chamber is in diffusing communication with the second pipe.

7. The system of claim 1, wherein the sensing chamber is in diffusing communication with the outlet chamber of the valve.

8. The system of claim 7, wherein the sensing chamber is in diffusing communication with the outlet chamber of the valve through an orifice upstream of the orifice in which air is introduced into the downstream chamber.

9. The system of claim 1, wherein the comparison means includes means receiving the closure and sensor signals, and responsive to the start of the closure signal, comparing the value of the sensor signal at predetermined intervals with the value of the sensor signal at past predetermined intervals, and providing a leakage signal responsive to the successive values of the sensor signal indicating an increase in the fuel concentration in excess of a predetermined amount within the sensing chamber.

10. The system of claim 1, wherein the comparison means includes means receiving the closure and sensor signals, and following a first predetermined interval following the start of the closure signal, recording at least one value of the sensor signal and comparing the value of the sensor signal at second succeeding predetermined intervals with a recorded value of the sensor signal, and providing a leakage signal responsive to at least one succeeding value of the sensor signal indicating an increase in the fuel concentration within the sensing chamber relative to the recorded value of the sensor signal in excess of a predetermined amount.

11. The system of claim 1, wherein the sensing chamber comprises an enclosure mounted in indirect flow communication with the second pipe.

12. The system of claim 11, further comprising a purge blower connected to inject air into the valve's outlet chamber, and wherein the enclosure includes a surface having a opening in indirect flow communication with the gases within the second pipe.

13. The system of claim 11, wherein the enclosure is mounted within the second pipe, said enclosure including a surface having an inlet orifice facing upstream within the second pipe, said enclosure further including a valve for blocking the inlet orifice responsive to absence of an activation signal and opening the inlet orifice responsive to the activation signal; wherein the control unit provides an activation signal at preselected times to the enclosure valve and to the comparison means; and wherein the comparison means provides the leakage signal responsive to the activation signal.

14. In a combustion system of the type having a combustion chamber; a source of pressurized gaseous fuel; an air duct for carrying combustion air to the combustion chamber; means for inducing air flow in the air duct to the combustion chamber; a fuel injection nozzle within the air flow; a valve for regulating flow of the fuel, said valve closing responsive to a closure signal and having an outlet chamber containing an orifice through which is bled a preselected flow rate of air into the chamber; a first pipe conducting the fuel from its source to the valve; a second pipe conducting the fuel from the valve to the nozzle; and a control unit providing the closure signal to the valve; an improved method for sensing leaking of fuel by the valve, comprising
 a) providing a sensing chamber;
 b) establishing diffusing communication between said sensing chamber and at least one of the second pipe and the outlet chamber of the valve;
 c) sensing the concentration of the fuel in the sensing chamber;
 d) providing a fuel concentration signal whose value is representative of the fuel concentration in the air within the sensing chamber; and then
 e) receiving the fuel concentration signal during the closure signal,
 f) comparing the value of the fuel concentration signal with a preselected standard, and
 g) providing a leakage signal responsive to a predetermined deviation in the value of the fuel concentration signal from the preselected standard.

15. The method of claim 14, wherein the comparing step includes comparing the value of the fuel concentration signal with a predetermined fuel concentration standard value, and if the fuel concentration is greater than the standard value, providing the leakage signal.

16. The method of claim 14, wherein the comparing step includes comparing the rate of change of the value of the fuel concentration signal with a predetermined standard value of the rate of change of fuel concentration, and if the fuel concentration is increasing more rapidly than the standard value, providing the leakage signal.

* * * * *

UNITED STATES PATENT AND TRADEMARK OFFICE
CERTIFICATE OF CORRECTION

PATENT NO. : 5,085,576

DATED : Feb. 4, 1992

INVENTOR(S) : Bonne et al.

It is certified that error appears in the above-identified patent and that said Letters Patent is hereby corrected as shown below:

Column 10, line 58, cancel "on" and substitute --one--.

Column 11, line 29, cancel "a" and substitute --an--.

Column 12, line 9, cancel "a" and substitute --an--.

Column 12, line 31, before "chamber", insert --outlet--.

Signed and Sealed this

Twenty-seventh Day of April, 1993

*Attest:*

MICHAEL K. KIRK

*Attesting Officer*

*Acting Commissioner of Patents and Trademarks*